United States Patent
Knee et al.

(10) Patent No.: US 7,379,041 B2
(45) Date of Patent: May 27, 2008

(54) INTERFACE AND METHOD FOR ERROR DETECTION IN IMAGE DATA TRANSMISSION

(75) Inventors: Werner Knee, Esslingen (DE); Thomas Spichale, Schoenbrunn (DE); Tobias Stumber, Stuttgart (DE); Axel Kirschbaum, Muehlacker (DE)

(73) Assignee: Robert Bosch GmbH, STuttgart (DE)

( * ) Notice: Subject to any disclaimer, the term of this patent is extended or adjusted under 35 U.S.C. 154(b) by 258 days.

(21) Appl. No.: 10/518,953

(22) PCT Filed: Apr. 2, 2003

(86) PCT No.: PCT/DE03/01083

§ 371 (c)(1),
(2), (4) Date: Sep. 22, 2005

(87) PCT Pub. No.: WO03/107676

PCT Pub. Date: Dec. 24, 2003

(65) Prior Publication Data

US 2006/0109347 A1    May 25, 2006

(30) Foreign Application Priority Data

Jun. 18, 2002    (DE) ................................ 102 27 199

(51) Int. Cl.
*G09G 3/36* (2006.01)

(52) U.S. Cl. ...................... 345/88; 340/146.2; 345/904

(58) Field of Classification Search .................. 345/88, 345/89, 90–100, 204, 213, 904; 340/146.1, 340/146.2
See application file for complete search history.

(56) References Cited

U.S. PATENT DOCUMENTS

| | | | |
|---|---|---|---|
| 5,689,513 A * | 11/1997 | Okita et al. ................. | 714/712 |
| 5,859,669 A | 1/1999 | Prentice | |
| 6,147,672 A * | 11/2000 | Shimamoto ................. | 345/589 |
| 2001/0024208 A1* | 9/2001 | Geisler ....................... | 345/638 |
| 2001/0030649 A1 | 10/2001 | Tomooka et al. | |
| 2001/0038387 A1 | 11/2001 | Tomooka et al. | |
| 2001/0040548 A1* | 11/2001 | Ikeda .......................... | 345/92 |
| 2003/0043142 A1* | 3/2003 | Ishibashi .................... | 345/213 |

FOREIGN PATENT DOCUMENTS

GB    2 356 300    5/2001

OTHER PUBLICATIONS

LVDS Owner's Manual, Moving Info With LVDS, Rev. 2.0, National Semiconductor, 2000, pp. 1-17.

* cited by examiner

*Primary Examiner*—Chanh D. Nguyen
*Assistant Examiner*—Shaheda A Abdin
(74) *Attorney, Agent, or Firm*—K Kenyon & Kenyon LLP

(57) ABSTRACT

An interface and a method for image data transmission that is used for data transmission through a plurality of data lines is described, the correctness of the transmitted data being checked by reference to control data. The checking capability is achieved in that at least one item of control data is transmitted through each data line.

10 Claims, 2 Drawing Sheets

INTERFACE AND METHOD FOR ERROR DETECTION IN IMAGE DATA TRANSMISSION

FIELD OF THE INVENTION

The present invention is directed to an interface for image data transmission.

BACKGROUND INFORMATION

Both analog and digital image data transmission methods are known for transmitting image data. In order to guarantee high image resolution, transmission methods that guarantee reliable data transmission at a high data throughput are required. In particular, interfaces and transmission methods in which image data is transmitted in parallel through a plurality of lines are known for this purpose. In addition to the actual image data information that describes the individual pixels, control information that is used for line synchronization or frame synchronization, for example, is also be transmitted. For this purpose, it is known to transmit all control signals through one of the data lines. Furthermore, U.S. Pat. No. 5,859,669 discusses an interface and an image data transmission method in which this control information is co-transmitted through a clock signal line that is used to control image data transmission. In order to check whether data is transmitted correctly, it is also known to add to the transmitted data additional test data that is transmitted together with the actual data. However, this test data reduces the volume of user data that may be transmitted since the transmission frequency may not be increased at will. To be able nevertheless to transmit a maximum volume of data, the check of the transmitted data is omitted, as in U.S. Pat. No. 5,859,669, for example.

SUMMARY OF THE INVENTION

An interface according to the present invention and a method according to the present invention for image data transmission may provide for performance of a check of the transmitted data for each of the data lines with an unchanged data transmission volume. In this case, the checking capability is achieved in that at least one item of control data for each data packet is co-transmitted on each data line, and the presence or correctness of the item of control data is checked for each of the data lines. While the transmitted image data may have practically any value in order to be able to fully utilize the available bandwidth, the control data, in contrast, changes its value at definable intervals since although a display's line and page refresh frequency may be subject to fluctuations, these move within a specific bandwidth so that a flicker-free and reliable image depiction in a display unit may result. If the item of control data is not received at all or if it remains constant for a period of time that exceeds the period length of the required change of line or of image page, then it is probable that the transmitted image data also has errors. In the case of safety-related displays, in particular, this error may be detected by evaluation of the control data so that a user may be warned about a potentially incorrect display. However, the available data transmission rate may still be utilized to the maximum degree.

The image data may be transmitted in data packets, e.g., digitally, in which case the correctness of a data packet may be checked individually. One pixel may be described by one data packet, one data line being provided for each primary color—red, green, and blue, for example. Each data packet is then provided with an item of control data, which in its smallest version includes one bit, so that only the smallest possible data capacity need be used for transmission of the control data. In this case, the control data includes at least one horizontal and one vertical display synchronization, which is used for line or frame synchronization.

The point in time of an expected control signal may be compared with the actual arrival of this control signal. If the control signal is not detected in time or if an expected point in time is exceeded by a degree greater than specified, then it is assumed that the control signal has not been transmitted correctly. It is possible, therefore, that there is a data transmission error.

It may be advantageous, moreover, to apply a direct voltage to the line for data transmission and to transmit data by varying this direct voltage by a value that is small in comparison with the absolute value of the direct voltage. This makes it possible to avoid undesirable electromagnetic radiation effects in the line, effects that may occur in the transmission of an alternating current signal, for example.

The use of an interface according to the present invention in a motor vehicle may be advantageous, in particular between a high-resolution display and one or more assigned image-producing units such as a driver information device, for example. Correct data transfer is guaranteed even over the long life of a motor vehicle.

Moreover, faulty data transfer may be determined even in cases where there is no longer any control signal at all on one of the data lines. In the event of a transmission error, it may also be advantageous to provide a backup line such as another available data bus through which the data intended for the defective data line may be transmitted. Furthermore, even only partial data may be transmitted advantageously through a backup line so that at least a display in an incorrect color or at a reduced resolution is made possible.

DETAILED DESCRIPTION

The interface according to the present invention and the method according to the present invention may be used for the transmission of any type of data. In particular, use for the transmission of image data may be advantageous since in this case very large data volumes are transmitted in a very rapid sequence. Furthermore, the interface according to the present invention may advantageously be used for safety-related applications since it makes it possible to check the correctness of the transmission. The interface according to the present invention and the method according to the present invention are explained in greater detail below by reference to the example of image data transmission in a motor vehicle. In particular, the method is applicable to transmission of a camera signal to a display unit provided in the vehicle. The camera may be configured as a night-vision camera in which detected persons or obstacles, for example, are displayed and highlighted in a warning color.

Figure 1:
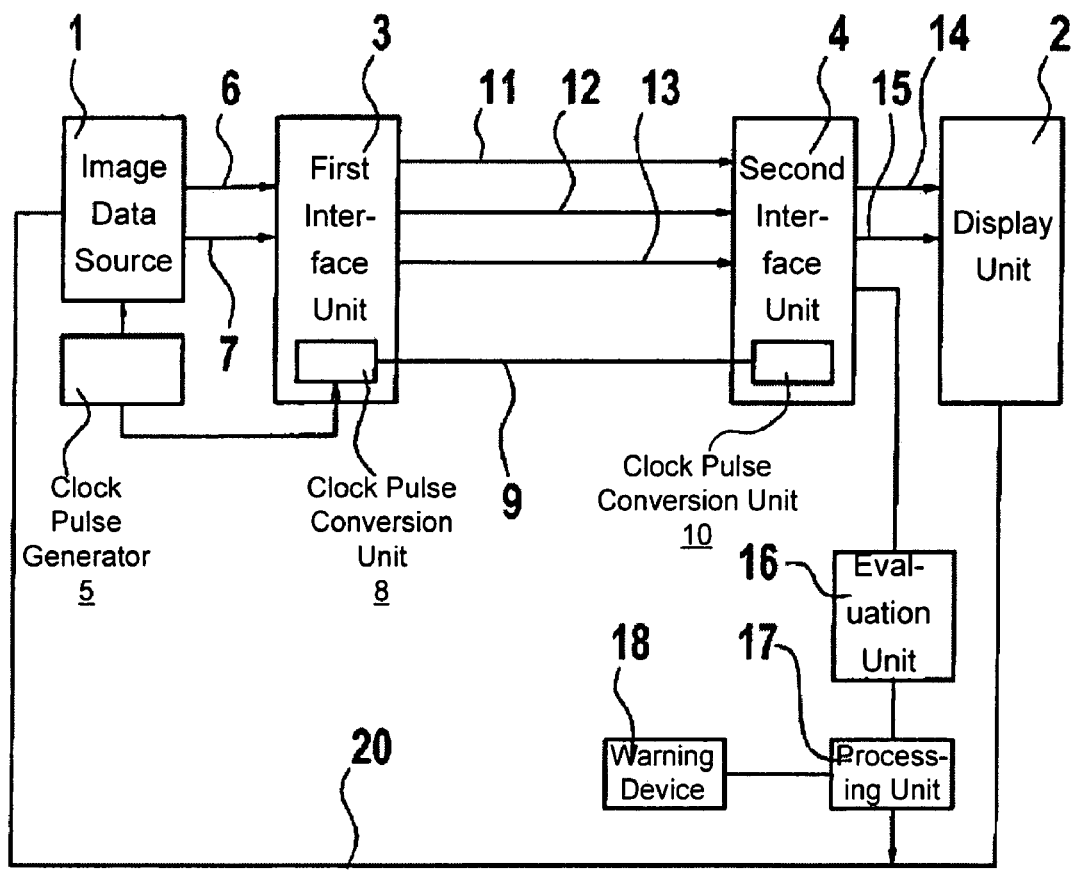
FIG. 1 shows an exemplary embodiment of an interface according to the present invention.

FIG. 1 shows a data connection between an image data source 1 and a display unit 2. Image data source 1 is connected to a first interface unit 3, and display unit 2 is connected to a second interface unit 4. A clock pulse generator 5 supplies to image data source 1 an operating clock pulse by which image data is transmitted through a first image data line 6 and control data is transmitted through a first control data line 7 to first interface unit 3. In first interface unit 3, the operating clock pulse produced by clock pulse generator 5 is supplied to a clock pulse conversion unit 8. In another exemplary embodiment, the clock pulse generator may also be advantageously integrated into the image data source. In an exemplary embodiment, clock pulse conversion unit 8 is used to multiply the clock pulse supplied by clock pulse generator 5 and to trigger first interface unit 3 with a multiple of the supplied clock pulse, in this case a factor of seven. In addition, the operating clock pulse supplied by clock pulse generator 5 is transmitted through a clock pulse transmission line 9 to second interface unit 4. The latter also includes a clock pulse conversion unit 10 that also increases the operating clock pulse by the same factor and thus clocks second interface unit 4. The control data received by first interface unit 3 through first image data line 6 and first control data line 7 is processed by first interface unit 3 and structured into data packets in accordance with a defined data protocol. These data packets are transmitted from first interface unit 3 to second interface unit 4 through a first, second and third data line 11, 12, and 13. The multiple of the operating clock pulse of first interface unit 3 and second interface unit 4 is selected in this case such that in each cycle of this clock pulse one bit of the data packet is transmitted through each of data lines 11, 12, and 13. The transmission capacity may be increased by providing additional data lines between first interface unit 3 and second interface unit 4. It is also possible to reduce data transmission to two data lines, for example. The data lines in this case may be configured as two-wire lines that conduct a direct voltage signal from first interface unit 3 to second interface unit 4. Data is then transmitted in that a first direct voltage value is assigned to a first signal value (low) while a second direct voltage value is assigned to a second data value (high), in which case the value "low" may be 1.2 V, for example, and the value "high" may be 1.4 V, for example. The voltage value is detected by a comparator circuit in second interface unit 4, for example. Data lines 11, 12, and 13 are configured in one exemplary embodiment as two-wire lines that make transfer of the direct voltage signal possible. A transmission method based on variable direct voltage is known as LVDS (Low Voltage Differential Signal).

In accordance with the defined data transmission protocol, second interface unit 4 receives back one image data signal and one control data signal from the data packets transmitted through data lines 11, 12, and 13, the image data being transmitted through a second image data line 14 and the control data being transmitted through a second control data line 15 to display unit 2. Display unit 2 may be, for example, a drive unit for a liquid crystal cell such as line and column drivers, the drive unit of a cathode ray tube, or a graphics arithmetic unit for depiction of the transferred image data in a display. Furthermore, the detected control data is forwarded to an evaluation unit 16 that checks the correctness of the transmitted control data and the transmitted clock pulse. For this purpose, the control unit has available at least information about the clock pulse frequency, the line change frequency or the image change frequency. A reset signal or the "data ready" signal that indicates transmission of valid data, for example, may be transmitted as additional control signals. The correctness of the transmitted control signals is checked in evaluation unit 16. For this purpose, evaluation unit 16 is provided with at least the transmitted clock pulse frequency, a stored frequency for an image line change, and a stored frequency for an image page change. Evaluation unit 16 first checks to determine whether any control signals are present and compares the input voltages with reference values that are provided for the high and low data values. If correct signals are present, then it compares the received control signals or a change in control signals with the point in time at which this change would have been expected. In this case, tolerances in connection with image transmission are taken into consideration, such as the lack of synchronization of a source signal with the transmission frequency, for example. If a maximum time period allowed for this purpose is exceeded, then an error is ascertained. If evaluation unit 16 detects a faulty transmission, then it forwards this information to a processing unit 17. The latter issues a warning to a user via a warning device 18 to the effect that the data depicted by display unit 2 is not correct. Furthermore, image data source 1 is connected to display unit 2 via a data bus 20 that is configured as a CAN (Controller Area Network) bus, for example. In the case of a faulty data connection via one of data lines 11, 12, or 13, image data source 1 is connected to display unit 2 via this data bus 20, which is otherwise used for transmission of other vehicle data, the data intended for transmission via the data line determined to be faulty being transmitted at least partially via data bus 20 so that at least a limited display is made possible using display unit 2.

Figure 2:
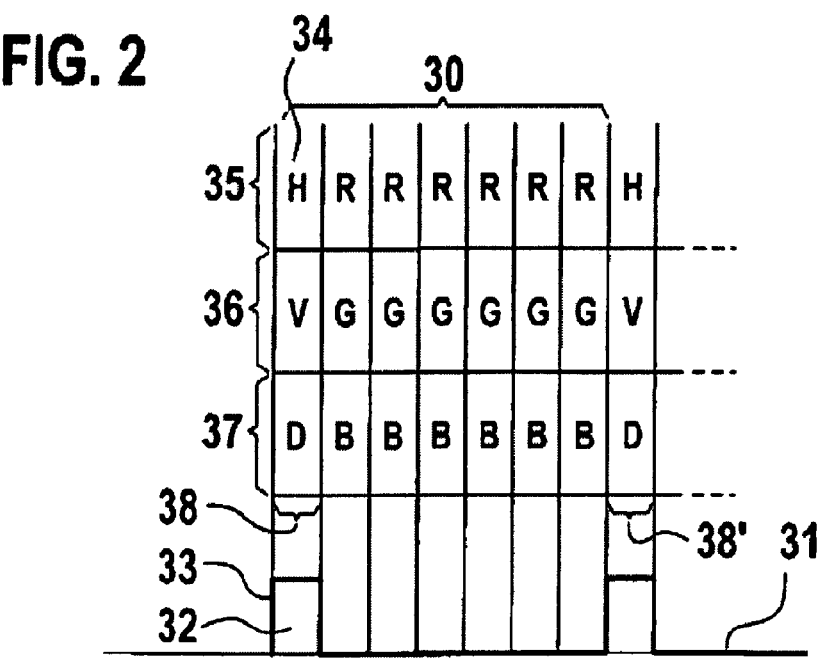
FIG. 2 shows an exemplary embodiment of a data packet according to the present invention.

FIG. 2 shows an exemplary embodiment for a transmitted data packet 30. Above a time axis 31 is shown a clock pulse signal 32, which, by its rising clock pulse edge 33, specifies the clock pulse for transmission of the data packet. Within one clock pulse period, exactly one data packet 30 is transmitted, and this packet is broken down into seven single bits 34, of which only one is designated in FIG. 2 to make the drawing easier to read. Data packet 30 is divided into a first data word 35, which is transmitted through first data line 11, a second data word 36, which is transmitted through second data line 12, and a third data word 37, which is transmitted through third data line 13. The individual bits are transmitted by the multiplied clock pulse within the time provided for the data packet. In the exemplary embodiment selected here, first data bits 38 of data packet 30 are in each case the data bits that contain the control information. This first data bit of a data packet is also shown for the subsequent data packet, where it is given the reference numeral 38'. H designates the horizontal synchronization signal (line synchronization), V the vertical synchronization signal (frame synchronization), and D the data ready signal that indicates transmission of valid data. Instead of the data transmission including seven bits per data word, as selected here, any other sizes of data words greater than or equal to 2 bits per data word may also be selected for data transmission. The size of seven bits shown in accordance with the exemplary embodiment permits a pixel description of 3×6 bits, which means that a sufficient data volume is available for the description of one pixel. A control signal is then given if the particular control data bit is set to the value "high." The other six bits designate for each data word a piece of information about the brightness of a primary color of a pixel. In this case, for example, a 6-bit piece of information for the brightness of the color red is specified in the first data word, the brightness for the color green is specified in second data word 36, and the brightness for the color blue is specified in the third data word. This is indicated in the drawing by letters R, G, and B. The division and sorting of data bits selected here represents only one exemplary embodiment, and it is possible to switch the assigned data bits with one another in any manner, provided that the position of the individual bits is unambiguously defined in a data protocol and it is ensured that at least one control bit is transmitted on each data line. The position of the control bit within data packet 30 or within data word 35, 36, or 37 is also freely selectable.

Figure 3:
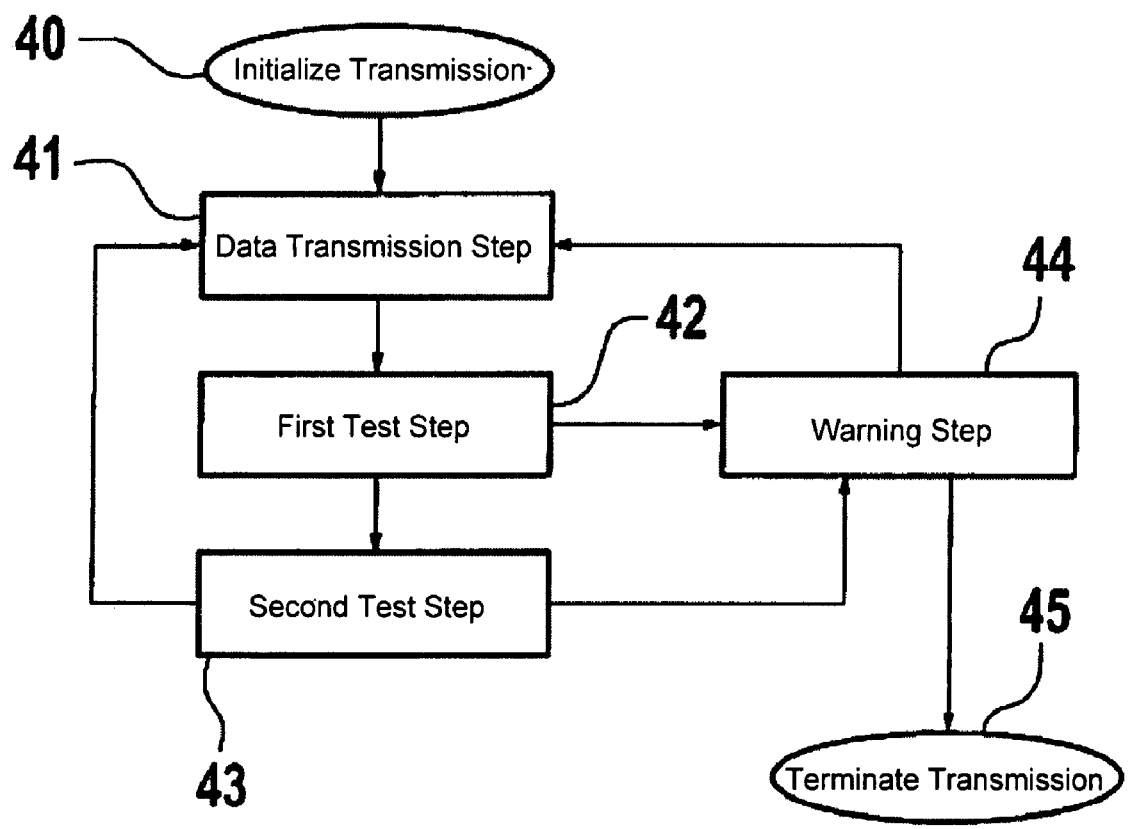
FIG. 3 shows an exemplary embodiment of a method sequence for checking transmitted data according to the present invention.

FIG. 3 shows a method sequence according to the present invention. Starting with an initialization step 40, image data transmission is initiated. In a data transmission step 41, a data packet is transmitted from first interface unit 3 to second interface unit 4. In a subsequent first test step 42, evaluation unit 16 checks to determine whether any control signal has been transmitted or whether the voltage value measured at the point in time for the presence of the control signal within the data packet is within a voltage window allowed for the high or low values. If this is the case, then the sequence branches to a second test step 43, in which a check is made to determine whether a change in the item of control data has occurred compared with the value in the previous data packets and, if not, whether this change in the item of control data is then overdue. If a control signal has been detected within a specified time period that is defined by the horizontal and vertical trigger frequency, for example, then it is assumed that the image data has also been transmitted correctly. The sequence then branches back to a next data transmission step 41. If, however, a faulty data transmission is ascertained, since either no control signal at all or no change in the control signal has been detected, then the sequence branches both from first test step 42 and from second test step 43 to a warning step 44, in which an acoustic and/or optical warning is issued to a user. If necessary, there is a switch to auxiliary transmission via data bus 20. However, if it is determined in first test step 42 that no clock pulse signal is transmitted, then successful data transmission is not possible. This information is also communicated to a user, and the data transmission method is terminated in a final step 45.

In the exemplary embodiment shown here, data is transmitted in one direction from first interface unit 3 to second interface unit 4. However, transmission may also be performed such that the transmission direction is alternated.

What is claimed is:

1. An interface for image data transmission, comprising:
    at least two data lines;
    one clock pulse line for transmitting a clock pulse;
    a counter for counting clock pulses since a last change in one item of control data; and
    a comparison unit for comparing a clock pulse value of the counter with a stored value;
    wherein:
        pixel data and the control data are transmitted through the at least two data lines for producing an image from the pixel data, at least one item of the control data being transmitted on each of the at least two data lines; and
        a correctness of pixel data transmission is checked by reference to control data transmission, an error condition being determined when the clock pulse value of the counter exceeds the stored value by a defined degree.

2. The interface of claim 1, wherein a selected number of pixel data and one item of the control data form a data packet, and wherein data packets are transmitted in accordance with the clock pulse.

3. The interface of claim 2, wherein the data packet describes one pixel of an image that is to be displayed, by specifying a color value.

4. The interface of claim 3, wherein the data packet includes six bits of pixel data and one bit of the control data.

5. The interface of claim 4, wherein the control data includes at least one vertical and one horizontal image synchronization signal.

6. The interface of claim 1, wherein a direct voltage is applied to the at least two data lines, and wherein data transmission is achieved in that a signal voltage whose value is lower than a value of the direct voltage is applied to the direct voltage.

7. The interface of claim 1, wherein the image data transmission is performed in a motor vehicle between a driver information device and a display unit.

8. A method for image data transmission, comprising:
    transmitting a clock pulse on one clock pulse line;
    transmitting pixel data and control data on at least two data lines for producing an image from the pixel data, wherein an item of the control data is transmitted on each of the at least two data lines;
    counting, by a counter, clock pulses since a last change in one item of the control data; and
    checking a correctness of transmission for each of the at least two data lines by reference to control data transmission;
    wherein the checking includes:
        comparing a clock pulse value of the counter with a stored value; and
        when the clock pulse value of the counter exceeds the stored value by a defined degree, determining an error condition.

9. The method of claim 8, wherein the error condition is also determined when no item of the control data is transmitted.

10. The method of claim 8, further comprising:
    switching data transmission to a backup line in an event of the error condition.

* * * * *